No. 715,349. Patented Dec. 9, 1902.
R. & T. B. CHRISTIE.
PNEUMATIC STRAW STACKER FOR THRESHING MACHINES.
(Application filed June 9, 1902.)

(No Model.) 3 Sheets—Sheet 1.

Witnesses.
B. E. Herald
M. Trimmer

Inventors.
Robert Christie,
Thomas Barcroft Christie
By John H. Hendry, Atty.

No. 715,349. Patented Dec. 9, 1902.
R. & T. B. CHRISTIE.
PNEUMATIC STRAW STACKER FOR THRESHING MACHINES.
(Application filed June 9, 1902.)
(No Model.) 3 Sheets—Sheet 2.
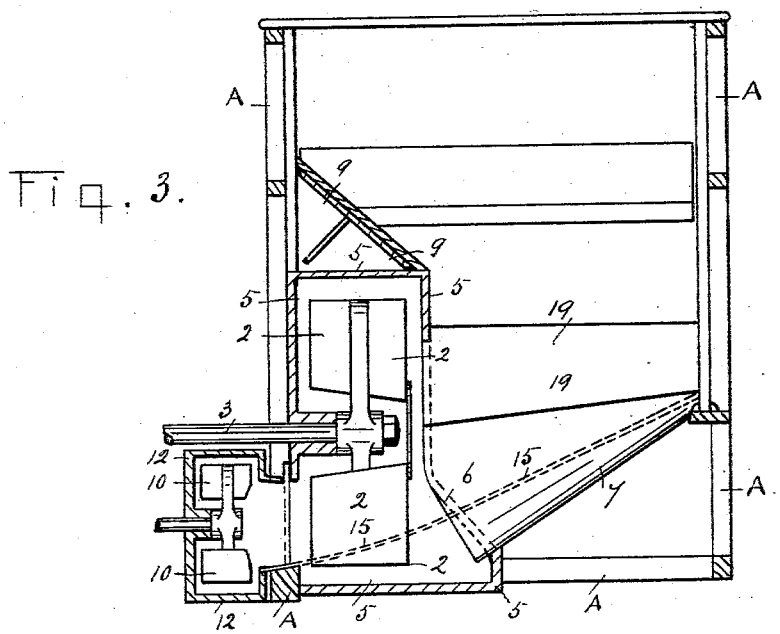
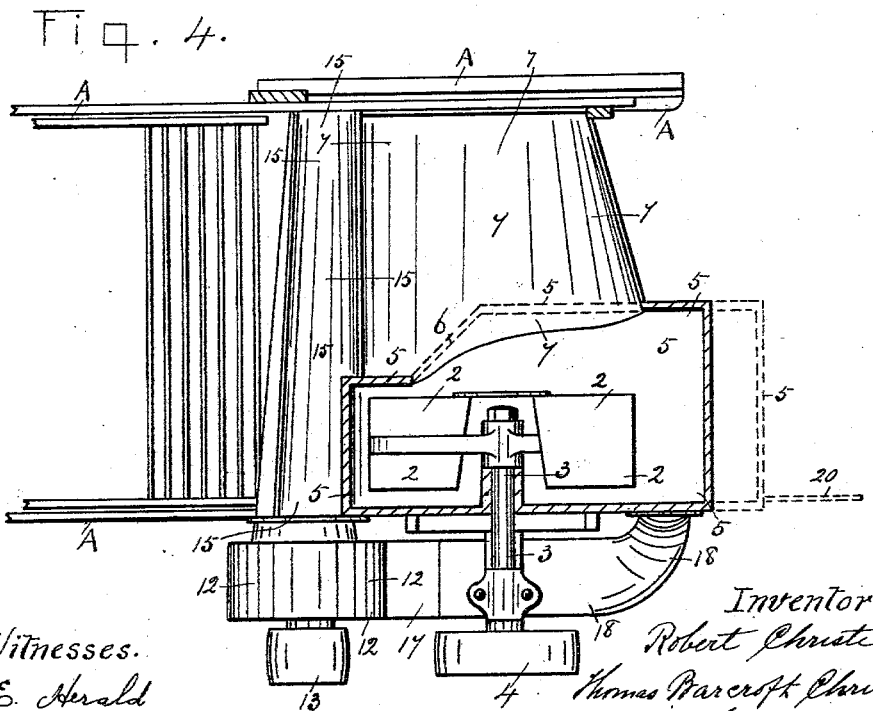
Witnesses.
B. E. Herald
M. Drummer
Inventors.
Robert Christie,
Thomas Barcroft Christie
By John K. Hendry Atty.

No. 715,349. Patented Dec. 9, 1902.
R. & T. B. CHRISTIE.
PNEUMATIC STRAW STACKER FOR THRESHING MACHINES.
Application filed June 9, 1902.)

(No Model.) 3 Sheets—Sheet 3.

Witnesses.
H. J. Drope
A. McPherson

Inventors.
Robert Christie,
Thomas Barcroft Christie.
By John H. Hendry, their atty.

UNITED STATES PATENT OFFICE.

ROBERT CHRISTIE AND THOMAS BARCROFT CHRISTIE, OF HAMILTON, CANADA.

PNEUMATIC STRAW-STACKER FOR THRESHING-MACHINES.

SPECIFICATION forming part of Letters Patent No. 715,349, dated December 9, 1902.

Application filed June 9, 1902. Serial No. 110,712. (No model.)

*To all whom it may concern:*

Be it known that we, ROBERT CHRISTIE and THOMAS BARCROFT CHRISTIE, citizens of Canada, residing at Hamilton, in the county of Wentworth and Province of Ontario, Canada, have invented certain new and useful Improvements in Pneumatic Straw-Stackers for Threshing-Machines, of which the following is a specification.

Our invention relates to improvements in pneumatic straw-stackers and chaff-savers in which the side of a threshing-machine, at the straw-discharging end thereof, is provided with straw and chaff fans capable of revolving together or separately in suitable casings or housings, a removable or fixed diaphragm to separate or divide the chaff from the straw, a straw and chaff discharging and conveying pipe communicating with the casing or housing of the straw-fan, and an independent chaff discharging and conveying pipe communicating with the casing of the chaff-fan.

The objects of our invention are, first, to provide a pneumatic straw-stacker in which the straw and the chaff fans are revolved by the same or separate belts; second, to provide a suitable parallel casing or housing for the straw-fan and adapted to receive and to discharge the straw in a proper manner; third, means to effect a division between the chaff and the straw, and, fourth, to afford facilities for discharging the straw and the chaff together and for discharging the chaff and the straw through separate conveying-pipes to any separate place to save the chaff. We attain these objects by the mechanism illustrated in the accompanying drawings, in which—

Figure 1:
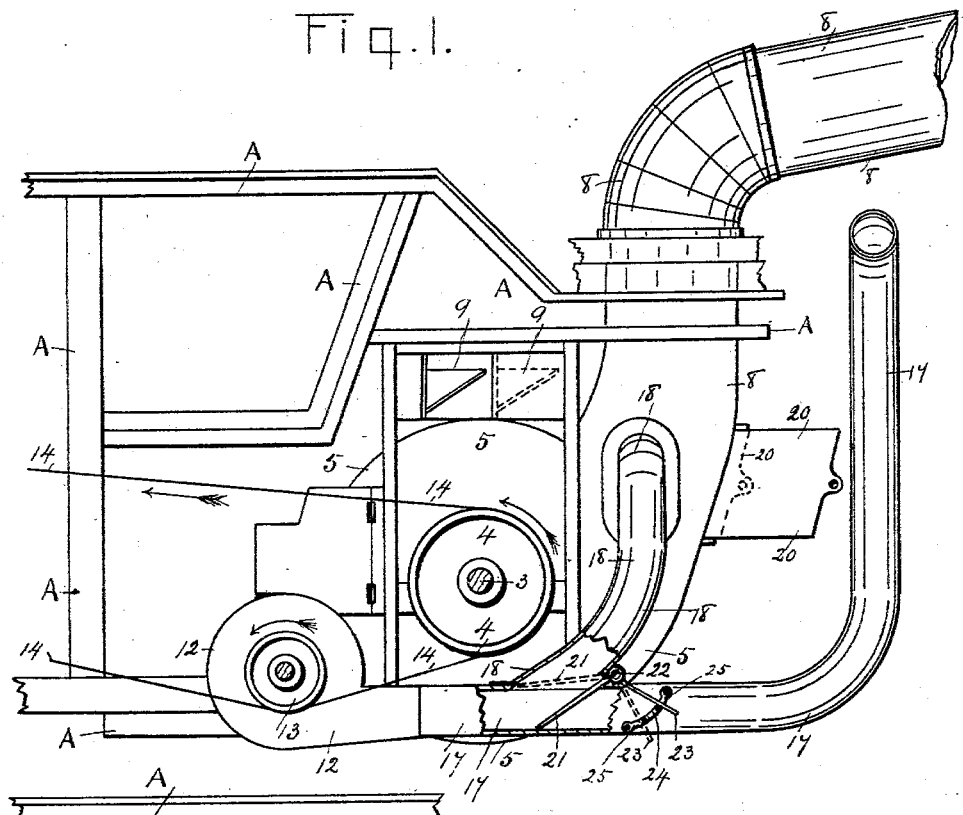
Figure 2:
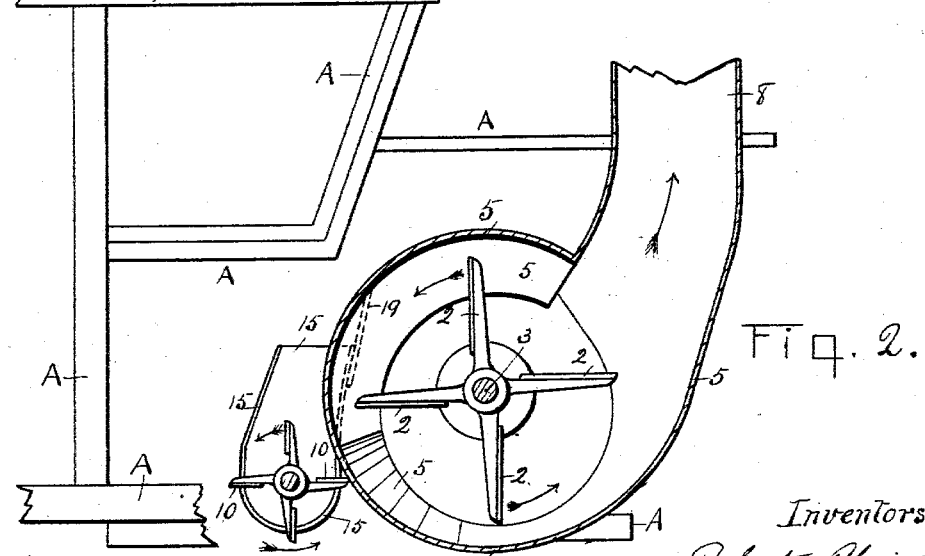
Figure 5:
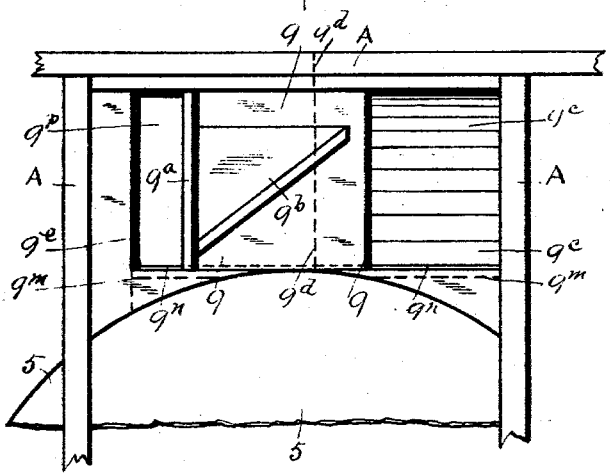
Figure 6:
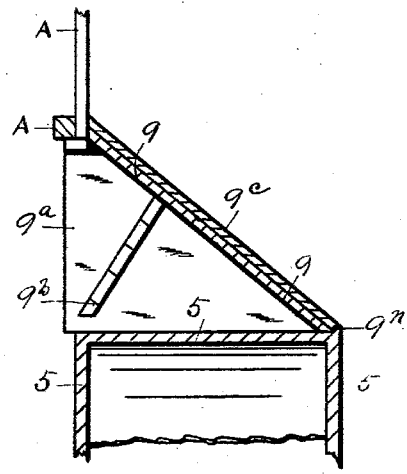

Figure 1 is a side elevation of the straw and chaff discharging end of a threshing-machine, showing belt connection with the fan-pulleys, the straw, and the straw and chaff discharge pipe, and the chaff-discharge pipe, and means for cutting off the chaff from the straw-discharge pipe and also from the chaff-discharge pipe and the slidable door immediately above the straw-fan casing, the broken lines of said door showing position of same when open. Fig. 2 is a sectional side elevation of the straw-fan casing and position of the chaff-fan and the chaff-hopper and chaff-diaphragm in relation thereto. Fig. 3 is a sectional end elevation of the straw-fan casing and the relative position of the chaff-fan, the chaff and straw diaphragm, and the inclined chaff-hopper; and Fig. 4 is a sectional plan through the center of the straw-fan casing, showing the upper part of said casing and also the position of the slidable door in broken lines, the upper part of the chaff-fan casing, the transverse and inclined chaff-hopper communicating with the chaff-fan casing, and the chaff-discharge pipe communicating with the straw-discharge part of the straw-fan casing. Fig. 5 is an enlarged detail elevation of the slidable inclined door immediately above the straw-fan casing. The door is shown about one-fourth way open. Fig. 6 is a sectional end elevation of the same slidable inclined door, together with the inclined straw or material guide over the top of the straw-fan casing and the upper part of the straw-fan casing.

Similar characters refer to similar parts throughout the several views.

In the drawings the framework of the straw-discharging ends of the threshing-machine is indicated by A. The straw-fan is indicated by 2 on its shaft 3 with drive-pulley 4.

5 is the housing or casing in which the fan 2 is mounted and revolves. The inner walls of this casing are parallel with the fan and connected by the oblique part 6 to allow greater width of the casing 5 at the middle part to receive the straw and at the straw-discharging end to facilitate the entrance of the straw to and the discharge of the straw therefrom. The inclined straw-hopper 7 communicates with the lower and widened part of the casing 5, hence with the fan 2, and is in position to receive the straw from the thresher in the usual manner. The periphery of the casing 5 commences to extend gradually from its lowest part toward the discharging part.

9 is an inclined slidable door in the framework A and immediately above the casing 2 to incline the straw over the casing toward the fan and is capable of sliding, so that when the said sliding door is open the operator may enter his arm for the purpose of taking out or putting in sieves or for adjusting parts of the machine in the interchanging of the several and varying sieves of the thresher and for other purposes connected therewith. The inclined slidable door 9 in Fig. 5 of the drawings is shown partially open. The protruding end 9ª of the door projects outward at a right angle with the door 9 and is strengthened by the bracket 9ᵇ, which is secured to the inclined part 9 of the door and to the projecting end part 9ª of the door. The inclined straw-guide 9ᶜ over the top of the straw-fan casing extends from the broken line 9ᵈ and over the right-hand part of the casing 5, (shown in Fig. 5 of the drawings,) and the door-opening 9ᵖ extends from said broken line 9ᵈ to left-hand end 9ᵉ of the framework A. The horizontal strip 9ⁿ on the casing 5 and the end 9ª of the door 9 retain the same in position when closed. The horizontal strip 9ⁿ forms a part of the door-seating 9ᵐ, which is flush with the top of the casing 5 and which extends the whole length of the door-opening 9ᵖ, together with the inclined straw-guide 9ᶜ. The door-seating 9ᵐ is shown in broken lines in Fig. 5 of the drawings.

The chaff-fan 10 is mounted in and capable of revolving in its casing 12, which forms an outer projecting part of the framework A. This fan 12 is revoived by its pulley 13 on the shaft of the fan by means of the driving-belt 14, which revolves the two said fans 2 and 10 the same way, as indicated by arrows, and at the same time. The inclined and tapering chaff-hopper 15 communicates with the casing 12 at its inner side and opposite to its fan, and the inclined hoppers of the fans 2 and 10, respectively, are of sufficient incline, width, and location to facilitate the reception of the straw and the chaff and feed the same to their respective fans previously referred to. The chaff-discharging end of the casing 12 is continued toward the discharging end by means of the chaff-discharging pipe 17 and the branch chaff-blowpipe 18. These pipes 17 and 18 both communicate with the chaff-fan casing 12, as shown in Fig. 1 of the drawings. The removable diaphragm 19, as shown in Figs. 2 and 3 of the drawings, divides the chaff from the straw and is located between the straw-hopper 7 and the chaff-hopper 15 and extends transversely from the straw-fan casing to the opposite side of the framework A and above the hopper of the chaff-casing 15.

20 is a slidable chaff cut-off door in the discharge part of the casing 5 and is shown open. The outer part of the slidable cut-off door 20 is shown in broken lines as it would appear when closed. This cut-off door 20 is capable of closing the entrance of chaff from the branch blowpipe 18 to the straw-discharge part of the casing 5.

At the juncture of the chaff-blowpipe 18 with the chaff-discharge pipe 17 a chaff cut-off gate 21 is pivotally connected at 22 and extends in said pipes to cut off the chaff from either one of said pipes 17 and 18. A spring-arm 23 extends outwardly from the gate 21 to manipulate and to secure the gate in desired position by means of its spring-arm engaging with a stop 24 on a segmental plate 25 on the pipe 17. The spring-arm 23 of its own resiliency presses against the plate 25, and when the gate is in position, as shown, the arm 23 is brought to bear against the upper part of the stop 24. The arm 23 may be released from the stop 24 by bringing the arm from its own resiliency. The same may be said regarding the arm 23 when the adjustment of the gate is desired to different position, as shown in broken lines.

The operation of the invention is as follows: The straw from the thresher falls into the inclined hopper 7 and slides directly into the fan-casing 5 by means of the suction caused by the revolving fan 2 and gravity of the inclined hopper. The fan 2 then forces the straw upward and into the discharge-pipe (designated by arrow in Fig. 2 of the drawings) and thence through the discharge-pipe 8. At the same time the chaff falls from the thresher into the inclined and tapering hopper 15 and thence into the casing 12 of the chaff-fan 10 by means of the suction caused by the revolving of the fan 10, and particularly by the incline of the hopper. The chaff is then blown through the connected pipe 17, thence upward into the branch blowpipe 18, through the open gateway of said pipe 18, thence through the open doorway of the discharge-pipe 8, and into said pipe 8, the straw and the chaff being blown together through the discharge-pipe 8 to a located place. When desirable to separate the chaff from the straw and discharge each to separate places, the door 20 of the pipe 8 is then closed to bar the communication between the pipe 18 and the discharge-pipe 8, and at this time the gate 23 is brought to position in the entrance of the pipe 18 to close the same from communication with the pipe 17, thereby allowing free access of the chaff into the pipe 17, through which the chaff is blown.

Various changes in the form, proportion, and minor details of our invention may be resorted to without departing from the spirit and scope thereof.

What we claim is—

1. In a pneumatic straw-stacker of the character specified, the combination with a suitable frame of a threshing-machine, of a straw-fan and a chaff-fan, coöperating with each other and revolved the same way and at the same time by one belt, as set forth.

2. In a pneumatic straw-stacker substantially as described, the combination with a threshing-machine of a straw-fan, a suitable parallel casing for the fan, said casing extending obliquely to the widened parallel part to admit the straw and communicate with the straw-discharge pipe, as set forth.

3. In a pneumatic straw-stacker, the combination in a threshing-machine of a straw-fan, a suitable parallel casing for said fan, a straw-discharge pipe connected to the casing, said casing extending obliquely and connecting a widened parallel part of the casing to admit the straw-discharge pipe, and a slidable inclined door immediately above the straw-fan casing, as set forth.

4. In a threshing-machine, the combination with a pneumatic straw-fan of a suitable parallel casing widened out at the straw-receiving part and straw-discharging part thereof, of an inclined straw-hopper communicating with the casing, a pneumatic chaff-fan, a suitable parallel casing for said fan, a tapering and inclined chaff-hopper communicating with said chaff-casing, and a diaphragm located between said hoppers and above the chaff-hopper, and extending transversely from the straw-fan casing to the opposite side of the machine, as set forth.

5. In a pneumatic straw-stacker, a straw-fan, a suitable parallel casing for the fan, a chaff-fan coöperating with the straw-fan, and revolved by the same belt, a parallel casing for the chaff-fan, a straw and chaff discharging pipe communicating with the casing of the straw-fan, a chaff discharging and blow-pipe communicating with said straw-discharging pipe and means for closing the communication of the chaff-blowpipe with the straw-discharging pipe, as set forth.

6. In a machine of the character described, a straw-fan, a suitable parallel casing for the fan, in combination with a coöperating chaff-fan, a suitable casing for the chaff-fan, feeding mechanism comprising inclined hoppers communicating with said casings, a diaphragm between said hoppers and above the chaff-hopper, and extending transversely from the straw-fan casing, to the opposite side of the hoppers, and means for revolving the fans in the same direction and at the same time, as set forth.

7. In a threshing-machine, a suitable straw-fan casing, a suitable chaff-fan casing, pneumatic fans capable of revolving coöperatively in said casings, inclined straw and chaff hoppers communicating with their respective casings, a straw-discharge pipe communicating with the straw-casing, a chaff-discharge pipe communicating with the chaff-casing, a branch pipe forming a juncture with the chaff-pipe and communicating with the straw-discharge pipe and means for opening said juncture and retaining the same in open position, as set forth.

8. The combination in a pneumatic straw-stacker of a straw-fan casing with a fan adapted to revolve therein, a chaff-fan casing with a coöperating fan adapted to revolve therein, a straw-discharge pipe communicating with the straw-fan casing, a chaff-pipe communicating with the chaff-fan casing, a branch pipe communicating with the chaff-pipe and with the straw-discharge pipe, means for cutting off the communication of the said branch pipe with the straw-discharge pipe, and means for cutting off the communication of the branch pipe with the chaff-discharge pipe.

9. In a pneumatic straw-stacker, in combination, a straw-fan casing, a fan mounted in said casing, a chaff-casing, a fan mounted in said casing, said fans capable of revolving in coöperation and by the same means, a pipe communicating with the straw-fan casing and adapted to receive and to discharge the straw propelled by the fan from said casing, an independent chaff-pipe communicating with the chaff-fan casing and adapted to receive and to discharge the chaff propelled by the chaff-fan, a branch pipe communicating with the chaff-discharge pipe and with the straw-discharge pipe, and means for cutting off the communication of the said branch pipe with the straw-discharge pipe and independent means for cutting off the communication of the chaff-discharge pipe with the branch pipe and retaining the cut-off in position, as set forth.

10. In a pneumatic straw-stacker of the character described, in combination a pipe adapted to receive straw at one end and to discharge the straw at the opposite end thereof, a second pipe adapted to receive chaff at one end and to discharge the chaff at the opposite end thereof, a branch pipe communicating with the body part of said straw-discharge pipe and with the body part of said chaff-discharge pipe, means to cut off the communication of the branch pipe with the straw-discharge pipe, independent means to cut off the communication of the chaff-discharge pipe with the branch pipe, and means for retaining the cut-off, of the chaff-discharge with the branch pipe in position, as and for the purpose herein set forth.

11. In a pneumatic straw-stacker for threshing-machines, in combination, a chaff-discharge pipe, a second branch chaff-discharge pipe in communication therewith, means for cutting off said communication, and means for retaining said cut-off in position, as and for the purposes set forth.

12. In a threshing-machine, a suitable straw-fan casing, a suitable chaff-fan casing, pneumatic fans capable of revolving coöperatively in said casings, suitable straw and chaff hoppers communicating with their respective casings, a diaphragm between said hoppers and above the chaff-hopper and extending transversely between the straw and chaff hoppers, as set forth.

In testimony whereof we affix our signatures in presence of two witnesses.

ROBERT CHRISTIE.
THOMAS BARCROFT CHRISTIE.

Witnesses:
JOHN H. HENDRY,
B. E. HERALD.